United States Patent [19]

Fast

[11] Patent Number: 4,643,209
[45] Date of Patent: Feb. 17, 1987

[54] VEHICLE WASHING MACHINE

[75] Inventor: Benjamin Fast, Sioux Falls, S. Dak.

[73] Assignee: Ronald D. Fast, Sioux Falls, S. Dak.

[21] Appl. No.: 858,180

[22] Filed: May 1, 1986

Related U.S. Application Data

[63] Continuation of Ser. No. 570,838, Jan. 16, 1984, abandoned.

[51] Int. Cl.[4] .............................................. B08B 3/02
[52] U.S. Cl. ..................................... 134/123; 134/45; 134/172; 239/587
[58] Field of Search ....................... 134/45, 50, 61, 82, 134/86, 87, 95, 103, 180, 181, 84, 94, 123, 101, 109, 104, 172; 68/58; 15/DIG. 2; 239/587

[56] References Cited

U.S. PATENT DOCUMENTS

| | | | |
|---|---|---|---|
| 2,658,216 | 11/1953 | Shusett et al. | 15/DIG. 2 |
| 2,803,025 | 8/1957 | Morison | 15/DIG. 2 |
| 2,822,564 | 2/1958 | Crivelli . | |
| 2,922,173 | 1/1960 | Lind et al. | 134/123 X |
| 3,009,469 | 11/1961 | Cunningham . | |
| 3,089,168 | 5/1963 | Blanford | 134/123 X |
| 3,196,888 | 7/1965 | Rousseau | 134/180 X |
| 3,224,108 | 12/1965 | Flaming | 15/DIG. 2 |
| 3,349,783 | 10/1967 | Ellis . | |
| 3,409,030 | 11/1968 | Schmidt | 134/123 |
| 3,410,284 | 11/1968 | Burger . | |
| 3,421,169 | 1/1969 | Hergonson | 15/DIG. 2 |
| 3,432,346 | 3/1969 | Hurst . | |
| 3,570,502 | 3/1971 | Farnsworth et al. | 134/45 |
| 3,911,938 | 10/1975 | Wiltrout | 134/123 X |
| 4,135,533 | 1/1979 | Gall et al. | 134/123 X |
| 4,288,255 | 9/1981 | Burger | 134/123 X |

FOREIGN PATENT DOCUMENTS

| | | | |
|---|---|---|---|
| 2164498 | 7/1983 | Fed. Rep. of Germany | 134/123 |
| 1137269 | 11/1966 | United Kingdom | 15/DIG. 2 |
| 1020283 | 5/1983 | U.S.S.R. | 15/DIG. 2 |

Primary Examiner—Harvey C. Hornsby
Assistant Examiner—Frankie L. Stinson
Attorney, Agent, or Firm—Palmatier & Sjoquist

[57] ABSTRACT

Car washing apparatus which provides for multiple uses of washing fluid and an improved vehicle washing structure utilizing a single multi-nozzle manifold that is configured to be operable to vary the spacing of the manifold from the vehicle to thereby increase the washing efficiency at areas of greatest accumulation of bugs and dirt and the like on an automobile. The spring biasing effect of a high pressure hose, connecting the manifold to a source of washing fluid under high pressure, is utilized in the operation of the apparatus. The conjoint operation of a contour following, two-wheeled assembly provides for tilting of the manifold and nozzles to tend to retain the direction of high pressure washing fluid spray perpendicular to the surface of the automobile.

5 Claims, 5 Drawing Figures

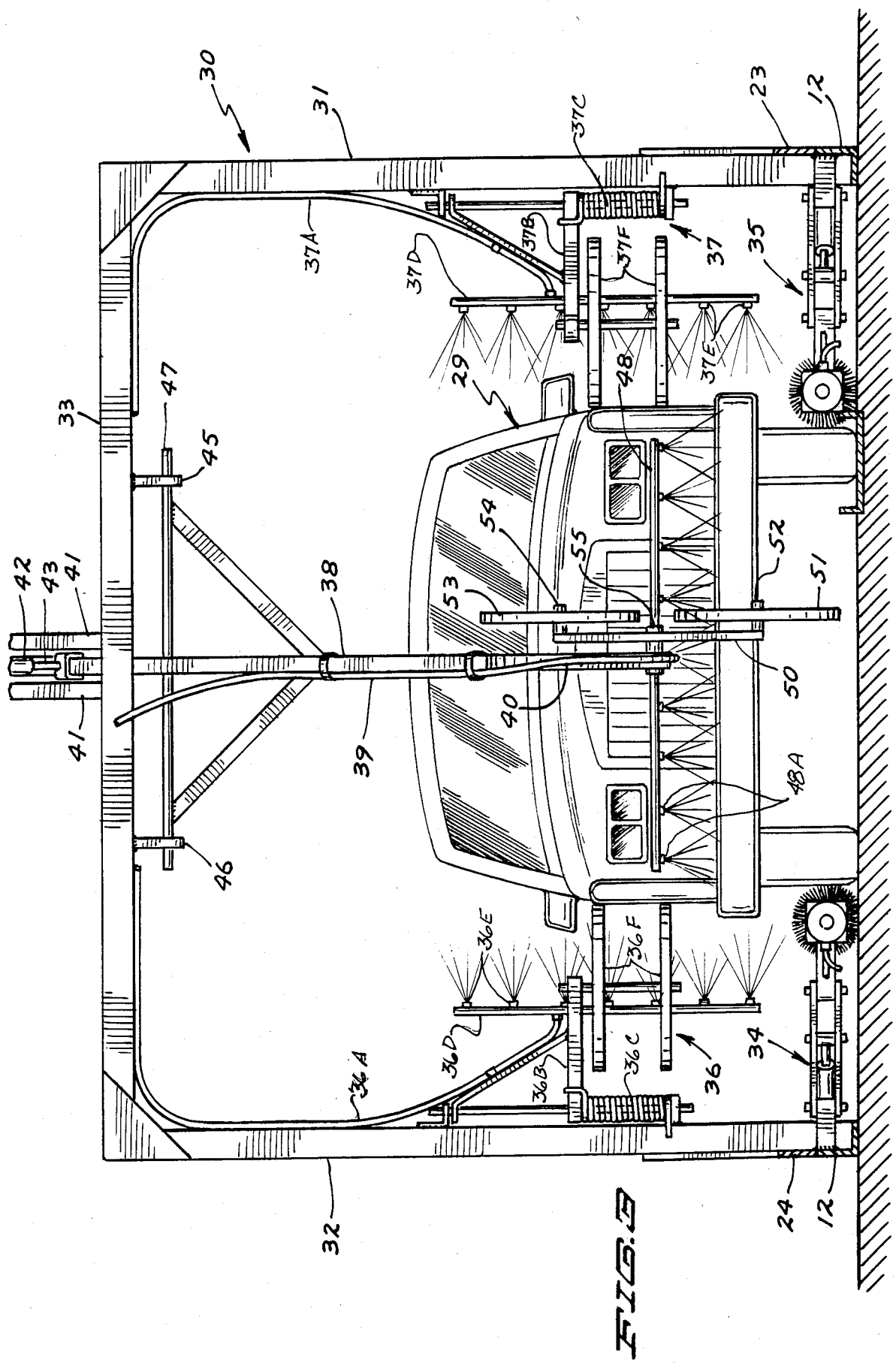

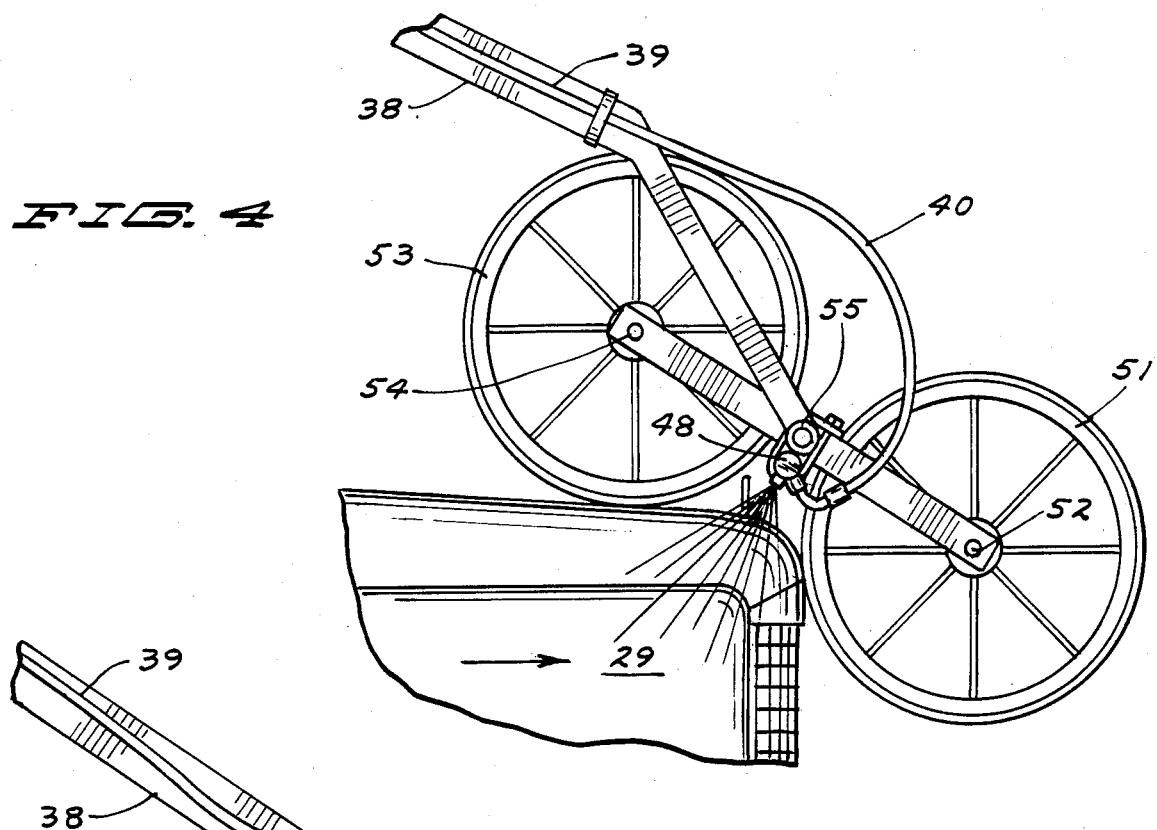
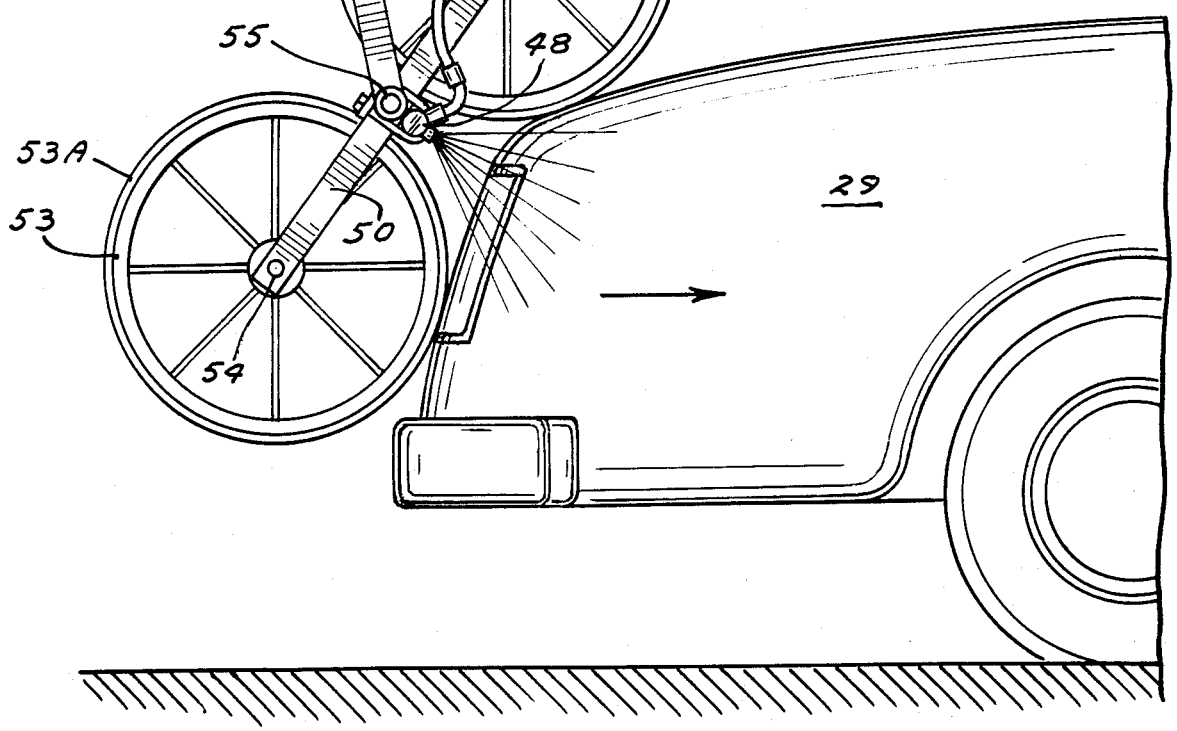

VEHICLE WASHING MACHINE

This is a continuation of co-pending application Ser. No. 570,838 filed on Jan. 16, 1984, abandoned.

BACKGROUND OF THE INVENTION

1. Field of the Invention

This invention relates generally to vehicle washing and is more particularly directed to machines for washing vehicles through the use of high pressure jets of washing fluid applied to the vehicle, in the absence of mechanical brushing or the like, to remove dirt and foreign particles from the surface of the vehicle.

2. Prior Art

The following is the list of U.S. patents discovered by me in the course of a pre-application search:

| U.S. Pat. No. | Inventor | Issued |
| --- | --- | --- |
| 2,822,564 | Crivelli | February 11, 1958 |
| 3,009,469 | Cunningham | November 21, 1961 |
| 3,196,888 | Rousseau | July 27, 1965 |
| 3,349,783 | Ellis | October 31, 1967 |
| 3,409,030 | Schmidt | November 5, 1968 |
| 3,410,285 | Burger | November 12, 1968 |
| 3,432,346 | Hurst | March 11, 1969 |
| 3,559,659 | Gougoulas | February 2, 1971 |
| 3,570,502 | Farnsworth et al | March 16, 1971 |
| 3,575,184 | Jurkens | April 20, 1971 |
| 4,288,255 | Burger | September 8, 1981 |
| 4,303,087 | Flaxman | December 1, 1981 |

Of the above patents, the Rousseau U.S. Pat. No. 3,196,888, the Gougoulas U.S. Pat. No. 3,559,659, the Jurkens U.S. Pat. No. 3,575,184 and the Farnsworth et al U.S. Pat. No. 3,570,502 are each directed to high pressure cleaning of vehicles with a washing fluid. As will become apparent from a consideration of the elements of my invention, set forth below, none of these patents present subject matter that provides the improved performance of my novel and unobvious invention and in any event, the operational efficiency and improved results over these and other known prior devices and apparatus has not, in the past, been attained.

BRIEF SUMMARY OF THE INVENTION

My improved vehicle washing machine embodies a system, apparatus and devices which provide an improved efficiency of operation and performance in providing the desired end result of cleansing the surface of a vehicle.

My invention provides for the successive use of suitably conditioned water for a high pressure washing operation, for a brushed washing operation of the wheels and tires of a vehicle and then for a pre-rinse to enhance the later-performed high pressure washing phase of operation of the machine. This feature is accomplished by the use of the washing fluid running down the side of a vehicle from the top and side nozzles onto the wheel brushes and into a sump disposed underneath a washing station.

My invention further provides an improved high pressure washing operation through control of the disposition of high pressure nozzles in a variably spaced relationship with respect to the surface of the vehicle to be cleaned so that certain areas that are typically intensively coated with an accumulation of dirt, bugs and the like are afforded a higher degree of force and concentration of the washing fluid under high pressure.

My invention also provides uncomplicated and efficient mechanism for the application of the washing fluid under high pressure to vehicles of various shapes and sizes. The elimination of water seals; the use of a lightweight movable broom; spray manifold and wheels together with a lifting effect provided by the high pressure spray nozzles and the use of the high pressure hose to aid in operation of the washing apparatus contribute to such efficient and uncomplicated mechanism and result in lower maintenance expenses.

Other objects and advantages of my invention will become apparent from a consideration of the appended specification, claims and drawings.

BRIEF DESCRIPTION OF THE DRAWINGS

FIG. 3 is an enlarged front elevational view taken across section line 3—3 on FIG. 1;

FIGS. 4 and 5 are enlarged fragmentary sketches showing the subject matter of FIG. 2 in various operative positions with respect to a vehicle undergoing a cleansing operation.

DESCRIPTION OF THE ILLUSTRATED EMBODIMENT

Figure 1:
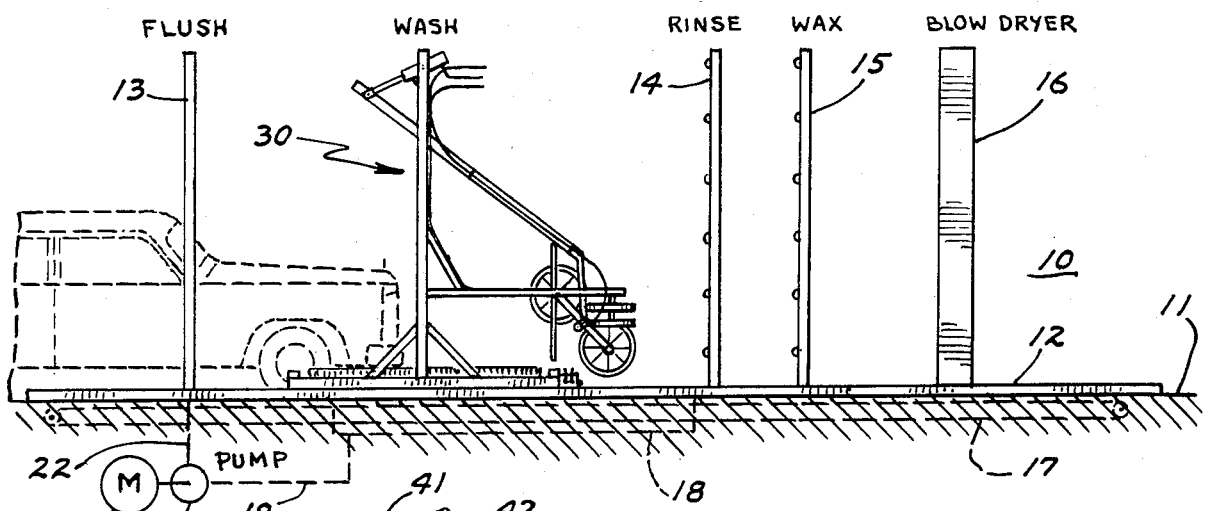
FIG. 1 is a side elevational sketch of a vehicle washing machine embodying the principles of my invention.

Referring to FIG. 1 of the drawings, my vehicle washing machine is shown indicated generally by reference character 10 and includes a horizontal surface 11 on which are mounted a pair of side rail members 12 in spaced-apart relationship so that a vehicle 29 may be propelled from left to right across work surface 11 between side rails 12 and successively through flush station 13, wash station 30, rinse station 14, wax station 15 and blow dryer station 16, each of generally rectangular shape and mounted upon and disposed vertically of side rails 12. Work surface 11 is provided with a sump 18 for receiving washing fluid from underneath washer station 30. The vehicle may be propelled from left to right through the car washing machine 10 by suitable means 17, such as a chain conveyor.

Referring to all of the figures of the drawings, flush station 13 is provided with a plurality of inwardly facing nozzles directed toward a car as it passes therethrough and the nozzles are shown connected to washing fluid supplied from sump 18 through pipe 19, pump 20 connected to motor 21 and pipe 22.

A car 29 is shown disposed in various positions in the several views and is connected to conveyor 17 for movement through my car washing machine through suitable means (not shown) connecting conveyor 17 to a portion of the vehicle.

Washer 30 is shown including vertically extending side members 31 and 32 that are attached at their lower ends to support members 23 and 24, in turn attached to the top of side rail members 12 disposed on work surface 11. A top member 33 is shown disposed across the tops of side members 31 and 32. Wheel washers 34 and 35 are shown disposed adjacent the lower ends of side members 32 and are extendible inwardly into engagement with the wheels of a vehicle. Wheel washers 34 and 35 include a rotating brush that is driven through suitable driving means when in engagement with the side wall of the tires and wheels of vehicle 29 as it passes through wash station 30. Similarly, a pair of side washers 36 and 37 are shown mounted upon the inner sides of side members 31 and 32. Side washer 36 includes a pair of wheels 36F that are rotatably disposed for rotation in a horizontal plane against the side of a vehicle on the ends of a arm 36B that is spring biased outwardly by torsion spring 36C and includes a vertically extending manifold 36D, connected to a high pressure hose 36A and including a plurality of nozzles 36E for spraying high pressure washing fluid onto the side of a vehicle as it passes through the washing station. Side washer 37 includes a pair of wheels 37F that are rotatably disposed for rotation in a horizontal plane against the side of a vehicle on the ends of a arm 37B that is spring biased outwardly by torsion spring 37C and includes a vertically extending manifold 37D, connected to a high pressure hose 37A and including a plurality of nozzles 37E for spraying high pressure washing fluid onto the side of a vehicle as it passes through the washing station.

A washer boom 38 is shown depending downwardly from the center portion of top member 33 and is in general longitudinal alignment with the axis of travel of a vehicle through my vehicle washing machine 10. Washer boom 38 includes an angled portion at its lower end and is adapted for rotation about the transverse horizontal axis of axle 47 that is journaled in a pair of washer boom brackets 46 and 45 extending downwardly from the underside of top 33, at an intermediate portion near the top end of washer boom 38.

A pair of upwardly extending brackets 41 are disposed at about the center of top member 33 for pivotally receiving a damper cylinder 42 having a piston 43 connected to the upper end of a washer boom 38 by a suitable pin 44.

A tilt frame 50 is shown disposed on the lower end of boom 38 and is rotatably mounted on a tilt frame pin 55 for limited rotation about pin 55 with respect to the lower end of boom 38. A pair of wheels 51 and 53, each having suitable soft treads 51A and 53A are shown rotatably disposed on axles 52 and 54 extending from the ends of tilt frame 50. A transversely disposed horizontally elongated manifold 48, having a plurality of nozzles 48A for discharging washing fluid under high pressure, is shown stationarily mounted on the center of tilt frame 50 between wheels 51 and 53. The size of wheels 36F and 37F, 51 and 53 determines the spacing of nozzles 36E, 37E and 48A from a vehicle 29.

A high pressure stiff but resilient hose 39 is shown having a top end adapted for connection to a source of washer fluid probably warm or hot water with suitable detergent under high pressure and is connected to manifold 58 at its lower end through an L-shaped connector 49 so that when the manifold is tilted, the stiffened resilient hose is flexed. High pressure hose 39 is shown stationarily mounted along the length of washer boom 38 and includes a lower section 40 that is free to flex and spring near the lower end of boom 38.

A consideration of the devices and apparatus of my car wash machine thus far illustrated may now become clear to one skilled in the art as constituting a system that introduces washing fluid under high pressure at wash station 30 from manifold 48 and from side washers 36 and 37, uses the same wash fluid to assist in the washing of the side walls and wheels of a vehicle which drains down and then further uses the wash fluid to prepare a car for washing as it passes through flush station 13. The apparatus of wash station 30 provides a novel and unobvious structure that is uncomplicated and efficient in operation and provides added advantages of improved efficiency for cleansing the front of the hood and top of the car whereat dirt and bugs are known to accumulate in greater numbers as the vehicle passes through typical environmental conditions. Wash station 30 also embodies lightweight elements that are easily manipulated over a vehicle as it passes through the high pressure washing part of the cycle. The weight of boom 38 and the apparatus attached to its lower end may be balanced by the operation of damper cylinder 42, suitable counterweights or other suitable means compensate for the various upwardly and downwardly directed forces including the jet effect of the nozzles on manifold 48 which provides tilting of the lower end of boom 39 at the beginning of a wash cycle. Wheels 51 and 53 may be fabricated of lightweight aluminum alloy and tires 51A and 53A of soft rubber with suitably configured treads so as not to rub or scrape the surface of vehicle 29.

OPERATION OF THE ILLUSTRATED EMBODIMENT

Referring to FIG. 1 of the drawings, a vehicle 29 is introduced at the left end of a vehicle washing establishment and through suitable means, not shown, motor 21 is energized to drive pump 20 to pump washing fluid accumulated in sump 18 to the interior facing nozzles disposed on flush station 13 so as to pre-rinse and prepare the vehicle for subsequent operations. As the vehicle is propelled or drawn through the successive stations from left to right on FIG. 1 by conveyor 17, it will pass through the successive stations of the establishment through wash station 30, rinse station 14, wax station 15 and blow dryer station 16. The operation of rinse, wax and blow dryer stations are that of typical stations possessing such capabilities in a vehicle washing establishment and may include the use of suitable vehicle sensing means to initiate operation as the vehicle passes through each of such stations.

Figure 2:
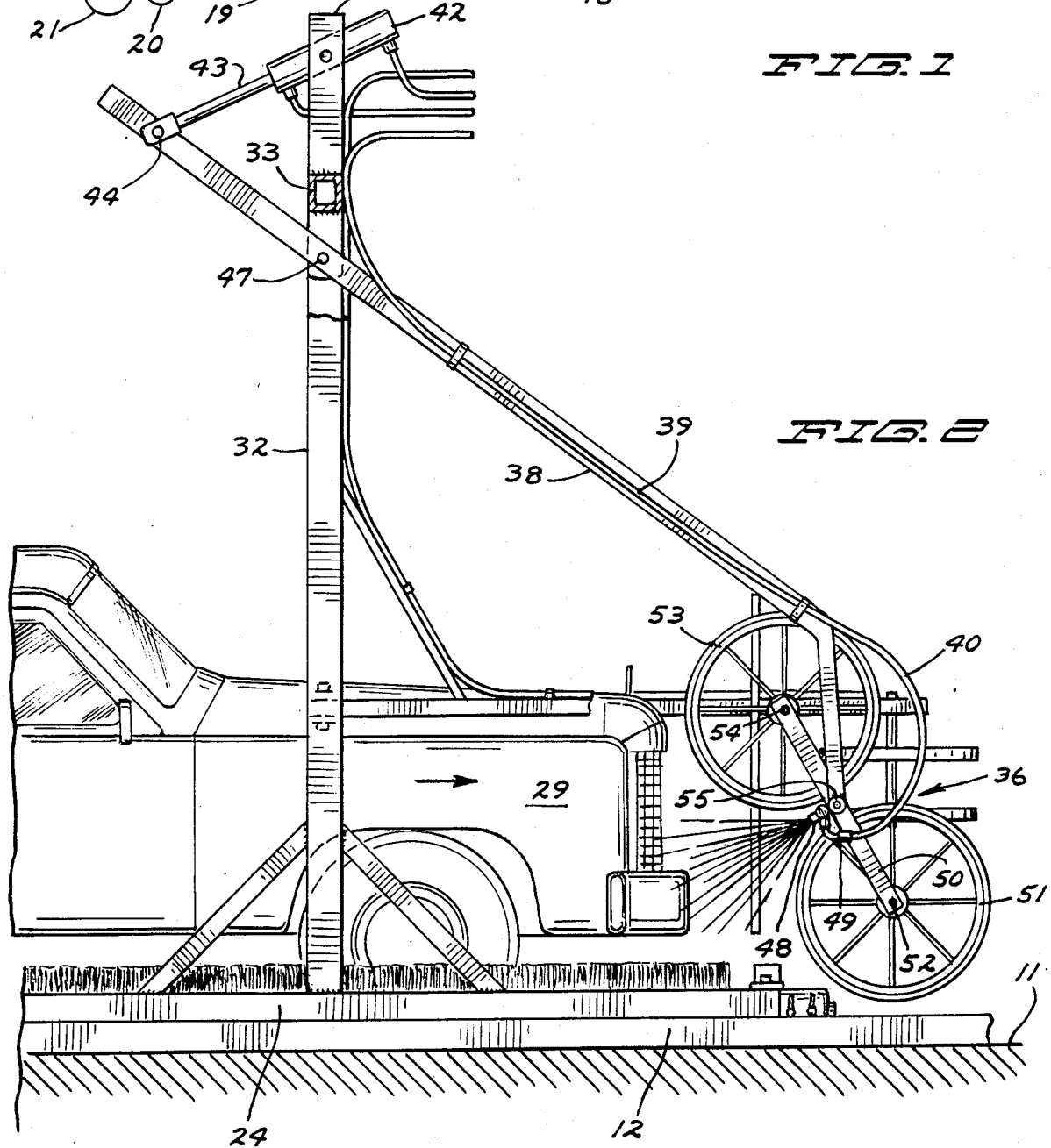
FIG. 2 is an enlarged portion of FIG. 1 showing a vehicle in relation to the high pressure washing apparatus and is partly broken away to illustrate the constructional features thereof.

Referring specifically to wash station 30, the initial operation is illustrated in FIG. 2 of the drawings and it will be seen that as a car approaches wash station 30, a source of suitably constituted washer fluid is energized to provide washer fluid under pressure, typically 1500 to 2000 pounds per square inch to the hoses attached to boom 38 and side washers 36 and 37.

As the vehicle is propelled through wash station 30, side washers 36 and 37 are biased toward the vehicle by suitable spring means and the wheels disposed thereon position vertically oriented manifolds containing spaced apart nozzles for discharging washing fluid under high pressure onto the side surfaces of the vehicle.

Similarly, wheel washers 34 and 35 are energized to be extended into engagement with the tire side walls and wheels of the vehicle and the brushes thereon are caused to rotate. The operation of the wheel and side wall washers and the side washers is continued as the vehicle passes through wash station 30. During this time, washing fluid that has been directed onto the outer surfaces of the vehicle will fall onto the rotating brushes of wheel washers 34 and 35 to assist in the cleaning operation performed by these elements.

The initial or "at rest" disposition of manifold 48 is illustrated in FIG. 2 and it will be noted that the high pressure spray emanating from the horizontally spaced-apart nozzles on manifold 48 will be directed toward the lower front of vehicle 29. Tilt frame 50 and/or the lower end of boom 38 may be provided with a suitable stop member so that the orientation illustrated in FIG. 2 will be obtained in the "at rest" position of tilt frame 50 and manifold 48. It may be noted that the spring biasing force exhibited by lower section 40 of washer boom hose 39 exerts a clockwise force on tilt frame 50 through connector 49, connected to horizontally disposed manifold 48 that is in turn stationarily disposed on tilf frame 50. An additional clockwise force may be provided by rendering wheel 51 heavier with respect to wheel 53 so that tilt frame 50 will be retained in the "at rest" position against a suitable stop means (not shown).

As vehicle 29 approaches wheel 53 tilt frame 50 will be further rotated in a clockwise direction about tilt pin 55 and simultaneously wheel 53 will tend to ride up onto the top of the front of the hood of vehicle 29 and the lower end of boom 38 will rise as the vehicle continues in the direction indicated. It may also be noted that the lifting effect provided by nozzles 48A on boom 48 tends to minimize the pressure of the wheels on the car body during the entire cycle and that the spring effect of portion 40 of hose 39 tends to maintain wheel 53 in engagement with the body of the car during the initial portion of the cycle. FIGS. 4 and 5 illustrate the relative disposition of the elements as vehicle 29 continues its motion through wash station 30 and it may be noted that at the top front of the hood of vehicle 29, manifold 48 and its nozzles will be closer to the surface of the vehicle to thereby exert a greater cleansing force and efficiency. As the car continues its movement through washing station 30, both wheels 51 and 53 will engage the surfaces of the car and, it may be noted that the disposition of horizontally extending manifold 48 will be closer to the front of the top of the vehicle above the windshield, another location at which bugs, dirt and the like tend to accumulate in greater amounts. Further progression of the car through washer station 30 completes the following of the contour of the car and the attendant spacing of manifold 48 to assure uniform cleansing and FIG. 5 illustrates the disposition of tilt frame 50 and wheels 51 and 53 as the car completes its travel through the washing cycle at washing station 30. At this point it may be noted that the relative position of wheels 51 and 53 is reversed and tilt frame 50 has rotated in a counterclockwise direction of approximately 120°. As the forward travel of vehicle 29 continues and wheel 51 is released from the surface of the vehicle the biasing force supplied by lower section 40 of high pressure hose 39 through connector 49 will be in a clockwise direction and the apparatus will assume the position and relationship of the elements shown at the right side of FIG. 2. It may also be noted that during the time that the lower end of boom 38 is moved up and down through the conjoint action of wheels 51 and 53 as determined by their engagement with the contour of the vehicle 29, a biasing force tends to retain boom 38 in its lower position. Cylinder 42 may be pneumatically operated through connection to a suitable source of air under pressure or may be provided with a spring loading effect according to the desires of the operator.

It may now be appreciated that my invention provides a lightweight, efficient washer apparatus for the front, top and rear surfaces of a vehicle. This provides an easily operable lightweight assembly as well as reducing maintenance costs by the elimination of seals and many moving parts and accompanying driving means found in typical prior art devices. Further efficiency is gained from the successive uses of the washing fluid for the washing operation, the wheel cleaning operation and the flushing or pre-rinsing operation.

I claim:

1. A vehicle washing apparatus comprising, in combination;
    a boom pivotally suspended above an elongated surface through which a vehicle to be washed is moved, said boom having a lower end adapted to be vertically movable as a vehicle passes thereunder;
    a tiltable frame pivotally disposed intermediate its ends at said lower end of said boom, said frame being rotatable in a vertical plane about about a horizontal axis and of lesser length than said boom;
    first and second wheels rotatably disposed at each end of said tiltable frame for rotation in said vertical plane;
    an elongate manifold pipe having a multiplicity of spray nozzles thereon and being mounted intermediate its ends on said tiltable frame for rotation therewith, said manifold pipe extending transversely of and horizontally from the tiltable frame and from the lower end of the boom in both directions, said tiltable frame being normally disposed at rest in a generally vertical attitude and said wheels being operable to sequentially engage the generally upright front surfaces, horizontal top surfaces and the generally upright rear surfaces of a vehicle, and nearly invert the frame as said vehicle is moved thereunder, to vertically displace the lower of said boom and to rotate said manifold pipe with the tiltable frame to maintain said nozzles at a predetermined attitude with respect to the front, top and rear surfaces of said vehicle; and a stiff and resiliently flexible water supply hose having connection with a source of wash water under pressure and extending downwardly along the single rigid arm of the boom to the manifold pipe intermediate its ends, the stiff hose having connection to the lower portion of the boom in spaced relation to the manifold pipe and forming a looped end portion free of the boom, the lower end of the hose being connected to the manifold at its lower side through a connector so that when the manifold is tilted away from its rest position the stiff resilient hose is flexed, whereby the flexed stiff hose tends to return the tiltable frame and nozzles to rest position after being nearly inverted during passage of a vehicle thereunder.

2. The apparatus of claim 1 in which the wheels are so dimensioned that the manifold pipe assumes a position closer to a horizontally extending surface of the vehicle at forward facing generally vertical surfaces at which greater deposits of dirt accumulate.

3. The apparatus of claim 1, in which one of the wheels is of greater weight.

4. A vehicle washing apparatus according to claim 1 wherein the wheels have diameters approximately equaling the center-to-center spacing between the wheels, the tilt axis being approximately midway between the center of the wheels, and the manifold pipe and spray nozzles adjoining the tilt axis.

5. A vehicle washing apparatus according to claim 1 and the manifold pipe extending along in eccentric relation to the tilt axis of the tiltable frame and tending to tilt the frame and nozzles toward the rest position.

* * * * *